(12) United States Patent
Sozer et al.

(10) Patent No.: US 11,296,585 B2
(45) Date of Patent: Apr. 5, 2022

(54) SINGLE STACK MULTIPHASE TRANSVERSE FLUX MACHINES

(71) Applicants: Yilmaz Sozer, Stow, OH (US); Tausif Husain, Akron, OH (US)

(72) Inventors: Yilmaz Sozer, Stow, OH (US); Tausif Husain, Akron, OH (US)

(73) Assignee: The University of Akron, Akron, OH (US)

( * ) Notice: Subject to any disclaimer, the term of this patent is extended or adjusted under 35 U.S.C. 154(b) by 320 days.

(21) Appl. No.: 16/516,635

(22) Filed: Jul. 19, 2019

(65) Prior Publication Data

US 2020/0204053 A1 Jun. 25, 2020

Related U.S. Application Data

(60) Provisional application No. 62/783,313, filed on Dec. 21, 2018.

(51) Int. Cl.
*H02K 21/38* (2006.01)
*H02K 21/10* (2006.01)
*H02K 21/04* (2006.01)

(52) U.S. Cl.
CPC ............ *H02K 21/38* (2013.01); *H02K 21/04* (2013.01); *H02K 21/10* (2013.01)

(58) Field of Classification Search
CPC .... H02K 21/38; H02K 2201/12; H02K 21/04; H02K 21/10
USPC ...................................................... 310/68 R
See application file for complete search history.

(56) References Cited

U.S. PATENT DOCUMENTS

| 5,117,142 A | 5/1992 | Von Zweygbergk | 310/156 |
| 5,543,674 A | 8/1996 | Koehler | 310/164 |
| 5,633,551 A | 5/1997 | Weh | 310/266 |
| 5,854,521 A | 12/1998 | Nolle | 310/12 |
| 5,925,965 A | 7/1999 | Li et al. | 310/268 |
| 6,949,855 B2 | 9/2005 | Dubois et al. | 310/152 |
| 7,830,057 B2 | 11/2010 | Gieras | 310/156.02 |

(Continued)

FOREIGN PATENT DOCUMENTS

| EP | 2 159 903 A2 | 3/2010 | H02K 1/14 |
| JP | 2003-339128 | 11/2003 | H02K 1/18 |

(Continued)

*Primary Examiner* — Terrance L Kenerly
(74) *Attorney, Agent, or Firm* — Renner Kenner Greive Bobak Taylor & Weber

(57) ABSTRACT

A single stack transverse flux machine includes a rotor assembly having an internal rotor disc with a rotor shaft extending from and rotating with the internal rotor disc, and a rotor ring having a plurality of stator poles interleaved with a plurality of interpoles. The plurality of stator poles and the plurality of interpoles are radially disposed around the internal rotor disc. Each stator pole has a plurality of core components spaced apart from one another. Primary magnets are interposed between the plurality of core components. The machine also includes a stator assembly with a plurality of shaped cores, each shaped core having a base with a plurality of legs with a corresponding gap therebetween. Each leg has a winding, and the shaped cores are positioned so that each leg is juxtaposed with a corresponding one of the plurality of core components and has an air gap therebetween.

17 Claims, 10 Drawing Sheets

(56) References Cited

U.S. PATENT DOCUMENTS

| | | | | |
|---|---|---|---|---|
| 8,358,046 B2* | 1/2013 | Platon | ............... | B63H 21/20 |
| | | | | 310/266 |
| 9,088,199 B2* | 7/2015 | Takahashi | ............ | H02K 21/145 |
| 2004/0155548 A1 | 8/2004 | Rasmussen | ................. | 310/168 |
| 2004/0251761 A1 | 12/2004 | Hirzel | ..................... | 310/156.25 |
| 2008/0211326 A1 | 9/2008 | Kang et al. | ..................... | 310/44 |
| 2008/0211336 A1 | 9/2008 | Sadarangani et al. | ... | 310/156.02 |
| 2011/0062723 A1 | 3/2011 | Calley et al. | ................ | 290/1 R |
| 2012/0235519 A1 | 9/2012 | Dyer et al. | ....................... | 310/46 |
| 2012/0249035 A1 | 10/2012 | Ueda | ....................... | 318/400.41 |
| 2012/0262019 A1 | 10/2012 | Smith et al. | ............. | 310/156.07 |

FOREIGN PATENT DOCUMENTS

| | | | | |
|---|---|---|---|---|
| JP | 2016-65294 | 4/2016 | ............ | C22C 38/00 |
| JP | 2019-41551 | 3/2019 | | |

\* cited by examiner

SINGLE STACK MULTIPHASE TRANSVERSE FLUX MACHINES

CROSS-REFERENCE TO RELATED APPLICATIONS

This application claims priority of U.S. Provisional Application Ser. No. 62/783,313 filed Dec. 21, 2018, which is incorporated herein by reference.

STATEMENT REGARDING FEDERALLY-SPONSORED RESEARCH OR DEVELOPMENT

This invention was made with government support under Grant No. ECCS 1307693 awarded by The National Science Foundation. The government has certain rights in the invention.

TECHNICAL FIELD

The present invention is directed to a single stack multiphase transverse flux machine. The machine may utilize a rotor which is either interposed between two stators in an axial direction, or is surrounded by a stator in a radial direction. The stators and their pole windings are held in place by non-magnetic end plates in one embodiment or a non-magnetic circular end plate in another embodiment. The number of stator and rotor poles may be non-equal to implement multiphase operations. And, the stator may be in a stepped configuration to improve torque density.

BACKGROUND ART

Various types of electric machines, also known as motor assemblies, are known, and these machines are configured to optimize performance for any number of factors. As is common in the optimization of motors, optimizing one characteristic may result in poor performance of some other characteristic. Ideally, for electric machines in the form of transverse flux machines, it is desirable to increase the torque density and the motor efficiency.

There are many different constructions proposed to obtain the aforementioned torque density and motor efficiency features. Some configurations or constructions use different shapes of the stator, while configuring the rotors in a correspondingly different way, or by utilizing different shapes for laminations used to construct the rotor and/or the stator.

Transverse flux machines are known to address some of the problems associated with the prior art as they provide a way to direct flux in the electric machines so as to increase torque density. However, such configurations still suffer from high leakage fluxes, thereby impacting the power factor of the motor's drive operation. Therefore, there is a need in the art for a multiphase transverse flux machine to develop compact and efficient electric machines.

SUMMARY OF THE INVENTION

In light of the foregoing, it is a first aspect of the present invention to provide a single stack multiphase transverse flux machine.

Another aspect of the present invention is to provide a single stack transverse flux machine, comprising a rotor assembly comprising an internal rotor disc, a rotor shaft extending from and rotating with the internal rotor disc, and a rotor ring comprising a plurality of stator poles interleaved with a plurality of interpoles, wherein the plurality of stator poles and the plurality of interpoles are radially disposed around the internal rotor disc, each stator pole having a plurality of core components spaced apart from one another, wherein primary magnets are interposed between the plurality of core components, and a stator assembly comprising a plurality of shaped cores, each shaped core having a base with a plurality of legs with a corresponding gap between each leg, each leg having a winding, the shaped cores positioned so that each leg is juxtaposed with a corresponding one of the plurality of core components and having an air gap therebetween.

BRIEF DESCRIPTION OF THE DRAWINGS

For a complete understanding of the objects, techniques and structure of the invention, reference should be made to the following detailed description and accompanying drawings, wherein.

DETAILED DESCRIPTION OF THE INVENTION

Figure 1:
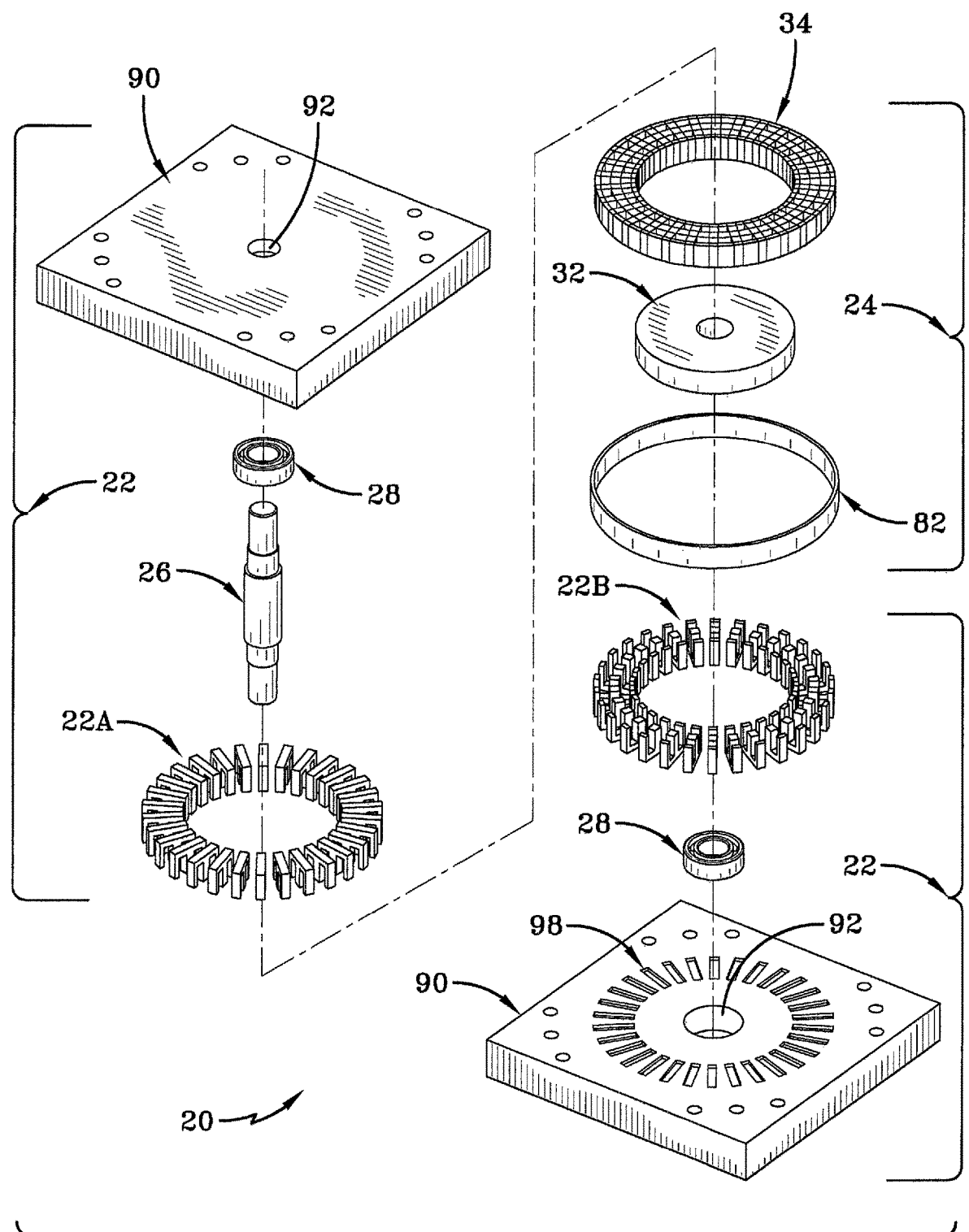
FIG. 1 is an exploded perspective view of a transverse flux machine according to the concepts of the present invention.

Generally, the present invention is directed to a single stack multiphase transverse flux machine (TFM) which provides a compact and efficient electric machine. As will become apparent the description proceeds, the machine may be configured in substantially two ways with each having their own variations. One embodiment may comprise two stators on either side of a single rotor arranged in an axial direction. Another embodiment may comprise a single stator surrounding a rotor in a radial direction. It will be appreciated that variations in one embodiment may be incorporated in the other embodiment, and vice versa.

The first embodiment may provide an axial air gap between the stator and rotor, whereas the second embodiment may provide a radial air gap between the stator and rotor. As will become apparent as the description proceeds, both topologies provide a transverse flux path in their respective iron cores. In either embodiment, the rotor comprises permanent magnets and an iron core, wherein the stators comprise E-shaped iron cores with pole windings wound around the three legs of the E-shaped core. Multiphase operation can be obtained on the single stack wherein the number of rotor poles and stator cores may be non-equal.

Referring now to the drawings, and in particular to FIGS. 1-5, it can be seen that a transverse flux machine according to one embodiment is designated generally by the numeral 20. The machine 20 includes a stator assembly 22 which may be axially split into split assemblies 22A and 22B such that a rotor assembly 24 is maintained in between the split assemblies 22A and 22B. An axial air gap 25A and 25B is formed between the respective assemblies 22A and 22B and the rotor assembly 24. A rotor shaft 26 is secured to the rotor assembly 24 and extends through both ends of the stator assembly, wherein at least one end of the shaft 26 may be connected to a load as is well understood in the art. Coupled to the rotor shaft 26 may be bearings 28 so as to allow rotation of the shaft within the stator assembly, as will be discussed in further detail.

Figure 2:
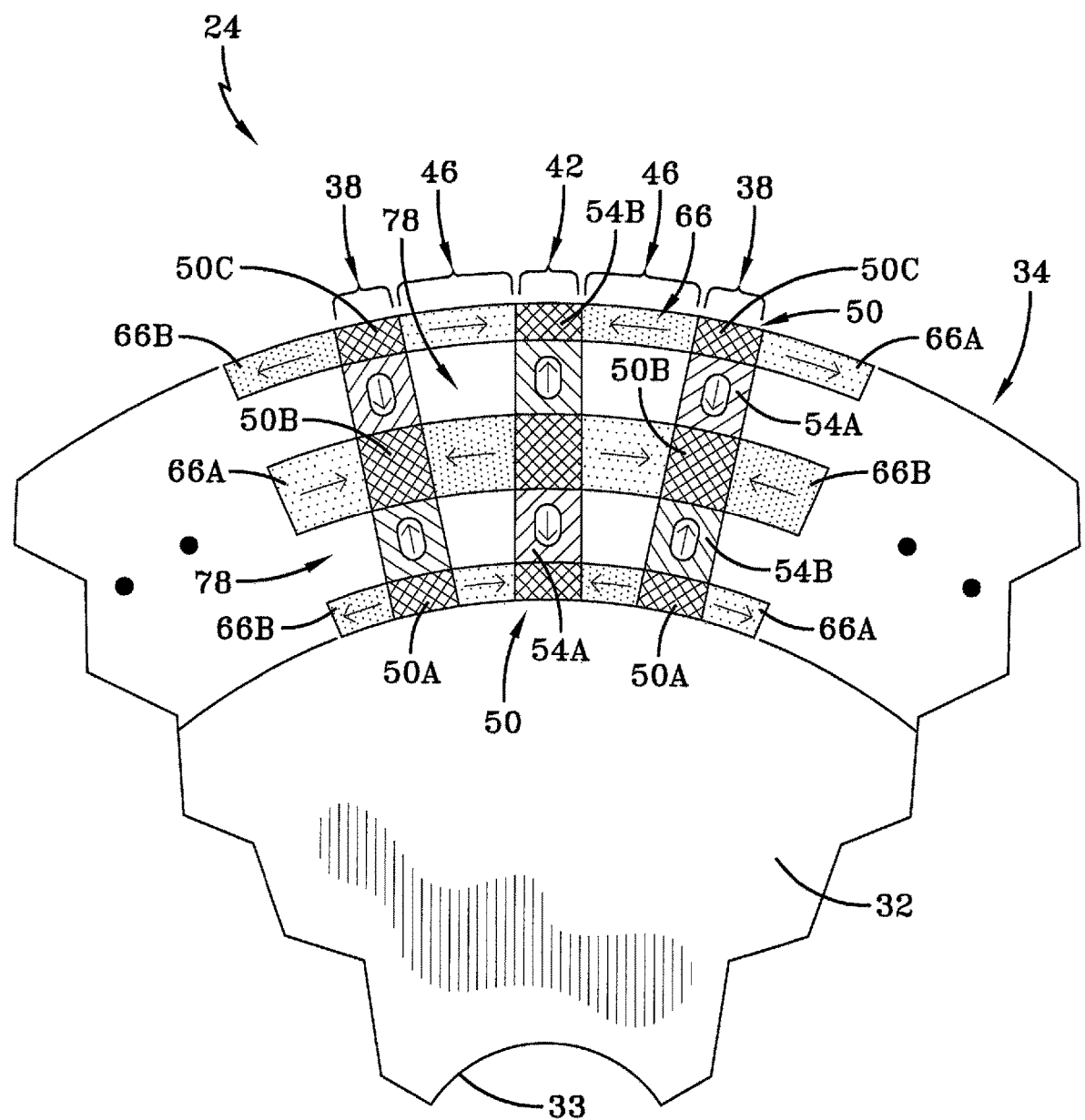
FIG. 2 is a partial top view of a rotor assembly used in the transverse flux machine according to the concepts of the present invention.
Figure 4:
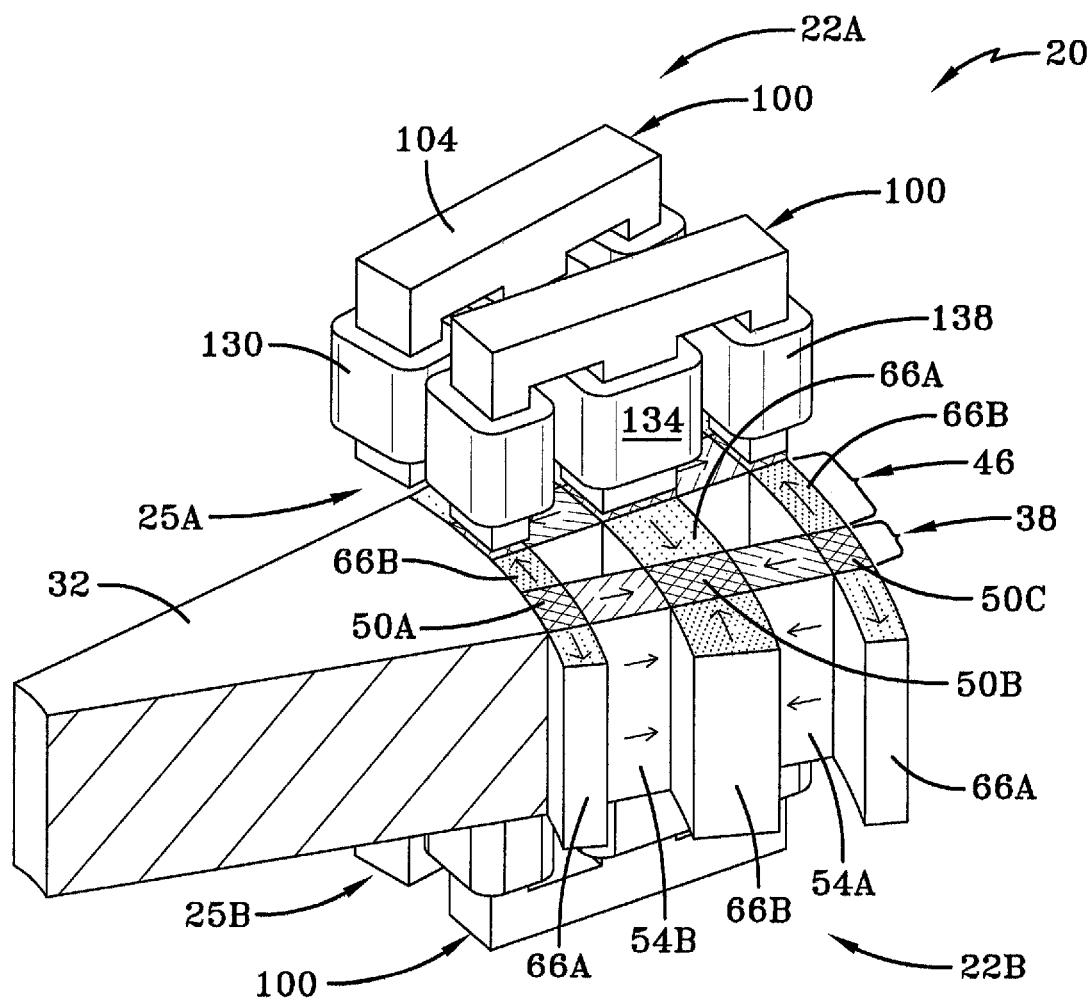
FIG. 4 is a partial perspective view of the rotor assembly and the stator assembly used in the transverse flux machine according to the concepts of the present invention.

As best seen in FIGS. 1, 2, and 4, the rotor assembly 24 includes an internal rotor disc 32, which in the present embodiment is made of a non-magnetic material, such as stainless steel. Other non-magnetic materials may be used in place of stainless steel. The rotor disc 32 may have a centrally located shaft opening 33 which receives the shaft 26 and is secured thereto. Accordingly, as the rotor disc 32 rotates, the shaft 26 likewise rotates. Secured to an outer periphery or radial surface of the rotor disc 32 is a rotor ring 34. The rotor ring 34 radially surrounds the disc 32 and comprises core elements and magnets which are interleaved with one another so as to provide an optimal transverse flux machine.

As best seen in FIGS. 2 and 4, the rotor ring 34 includes a plurality of stator poles 38 and 42 which are radially disposed about the rotor disc 32 and are interleaved with one another. As will be discussed in further detail, the stator poles alternate between a radially focused stator pole 38 and a radially diffused stator pole 42. Radially interposed between each of the stator poles 38 and 42 is an interpole 46. Each stator pole 38 and 42 comprises cores and magnets which extend radially from the disc 32. The stator poles 38 and 42, and the interpoles 46 are distinguishable from each other in the way flux passes therethrough. As best seen in FIG. 2, flux flow through magnets contained in the poles is represented by directional arrows.

Each pole 38 and 42 includes rotor core components 50 which comprise the stacked laminated steel plates, wherein all of the plates may be of a uniform thickness. The rotor core components 50 comprise an inner core 50A which is positioned radially adjacent the disc 32 wherein their plates are stacked axially. Radially and outwardly spaced apart from the inner core 50A is a middle core 50B which also provides for laminated steel plates stacked axially. Radially and outwardly spaced apart from the middle core is an outer core 50C which also comprises a plurality of laminated steel plates stacked axially. Interposed radially between the cores 50A, 50B, and 50C are flux focusing magnets which may also be referred to as primary magnets 54. For the radially focused stator pole 38 one of the primary magnets may be identified as a radially inward flux focusing magnet 54A which is positioned in between the outer core 50C and the middle core 50B, and a radially outward flux focusing magnet 54B is positioned in between the inner core 50A and the middle core 50B. As a result, the magnets 54 utilized in the radially focused stator pole 38 are directed into the middle core 50B from both radial sides.

For the radially diffused stator pole 42, the position of the primary magnets 54 are radially switched. As a result, for the radially diffused stator pole 42, the radial inward flux focusing magnet 54A is positioned in between the middle core 50B and the inner core 50A such that any flux is directed radially inward toward the inner core 50A, Positioned in between the middle core 50B and the outer core 50C is the radially outward flux focusing magnet 54B. As a result, the primary magnets 54 direct any flux radially away from the middle core 50B for the radially diffused stator pole 42.

Radially interposed between each stator pole 38 and stator pole 42 is an interpole 46. The interpole provides a q-axis of the rotor and further wherein the middle of the interpole provides a d-axis of the rotor. The interpole 46 comprises intermediate magnets 66 which are radially positioned in between the respective cores 50. The intermediate magnets 66 are of two types. As best seen in FIG. 2, depending on where the magnets 66 are positioned with respect to the cores 50A, 50B, and 50C, and whether they are positioned adjacent a radially focused stator pole 38 or a radially diffused stator pole 42, determines placement of a clockwise (CW) leakage reduction magnet 66A or a counterclockwise (CCW) leakage reduction magnet 66B. For a radially diffused stator pole 42, the radially adjacent interpoles are configured to enhance the flux path. In particular, the innermost and outermost cores 50A and 50C are positioned so that a CW leakage reduction magnet 66A is to the left of the cores 50A and 50C, as shown in FIG. 2, and a CCW leakage reduction magnet 66B is to the right of the cores. For the middle core 50B, a CCW leakage reduction magnet 66B is positioned to the left of the core 50B, and a CW leakage reduction magnet 66A is positioned to the right of the core 50B. With the positioning of the primary magnets 54 and the intermediate magnets 66 it is evident that flux is directed into the middle cores 50B of the radially focused stator poles 38, and away from the middle cores 50B of the radially diffused stator poles 42. The arrangement of the outer and inner cores 50A and 50C with the magnets 54 and 66 also enhance the flux flow pattern.

Gaps 78 are provided laterally in between the radially adjacent primary magnets 54A and 54B, and radially in between the magnets 66A and 66B. Skilled artisans will appreciate that these gap openings may be filled with a structural adhesive or other similar material so as to secure the magnets and cores of the rotor ring 34 to one another.

Referring back to FIG. 1, it can be seen that an outer ring 82, which in the present embodiment is made of a non-magnetic stainless steel material, may be positioned around the outer cores 50C and the magnets 66 so as to maintain the structural integrity of the rotor assembly. It can also be seen that the stator assembly 22 is split axially, wherein a stator assembly 22A is positioned on one side of the rotor assembly and a stator assembly 22B is positioned on the other side of the rotor assembly. Both stator assemblies are retained by a respective end plate 90 which may also be made of a non-magnetic stainless steel material. The ring 82 and the plates 90 may be made of other non-magnetic materials. Extending through each end plate 90 is a shaft/bearing hole 92 which receives corresponding bearings 28. The plates 90 may also provide a plurality of mounting holes 94 which allow the machine 20 to be mounted to other structures. Each end plate 90 has radially disposed thereabout a plurality of core pockets 98 which are arranged around the shaft hole 92 and maintained in substantially equal angular increments. In some embodiments, as will be discussed in detail later, the core pockets 98 in one end plate may be slightly skewed with respect to the core pockets maintained in the opposing end plate 90.

Figure 3:
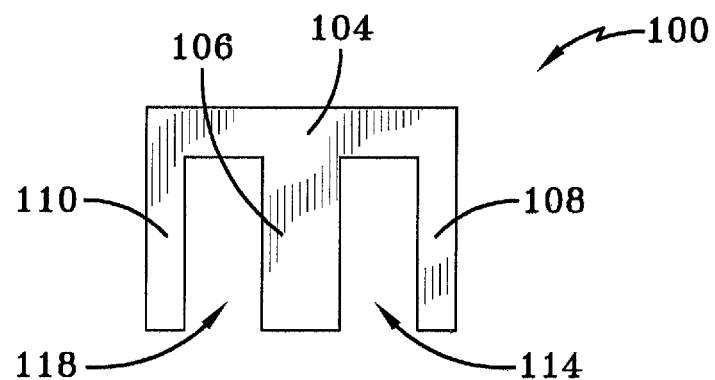
FIG. 3 is an elevational view of an E-shaped core utilized in a stator assembly of the transverse flux machine according to the concepts of the present invention.

Referring now to FIG. 3, it can be seen that an E-shaped core is designated generally by the numeral 100. The E-shaped core or E-core includes a base 104 which is received in a corresponding core pocket 98. Extending substantially perpendicularly from about a middle of the base 104 is a middle leg 106. Extending from one end of the base 104 is an outer radial leg 108 and extending from an opposite end of the base 104 is an inner radial leg 110. The middle leg 106 and outer radial leg 108 form an outer gap 114 therebetween. In a similar manner, the middle leg 106 and the inner radial leg 110 form an inner gap 118 therebetween. In the embodiment shown, the outer and inner legs may have a same thickness and the middle leg has a somewhat larger thickness than either of the outer or inner legs. The E-core 100 may be constructed of stacked and laminated steel plates wherein all of the plates may be of a uniform thickness.

As best seen in FIG. 4, each of the legs 104, 106, and 108 may have a respective winding. In particular, the inner radial leg 110 has an inner leg winding 130; the middle leg 106 has a middle leg winding 134; and the outer radial leg 108 has an outer leg winding 138. The gaps 114 and 118 are sized so as to accommodate the windings 130, 134, and 138. Skilled artisans will appreciate that the leg windings may also be referred to as pole windings.

Figure 5:
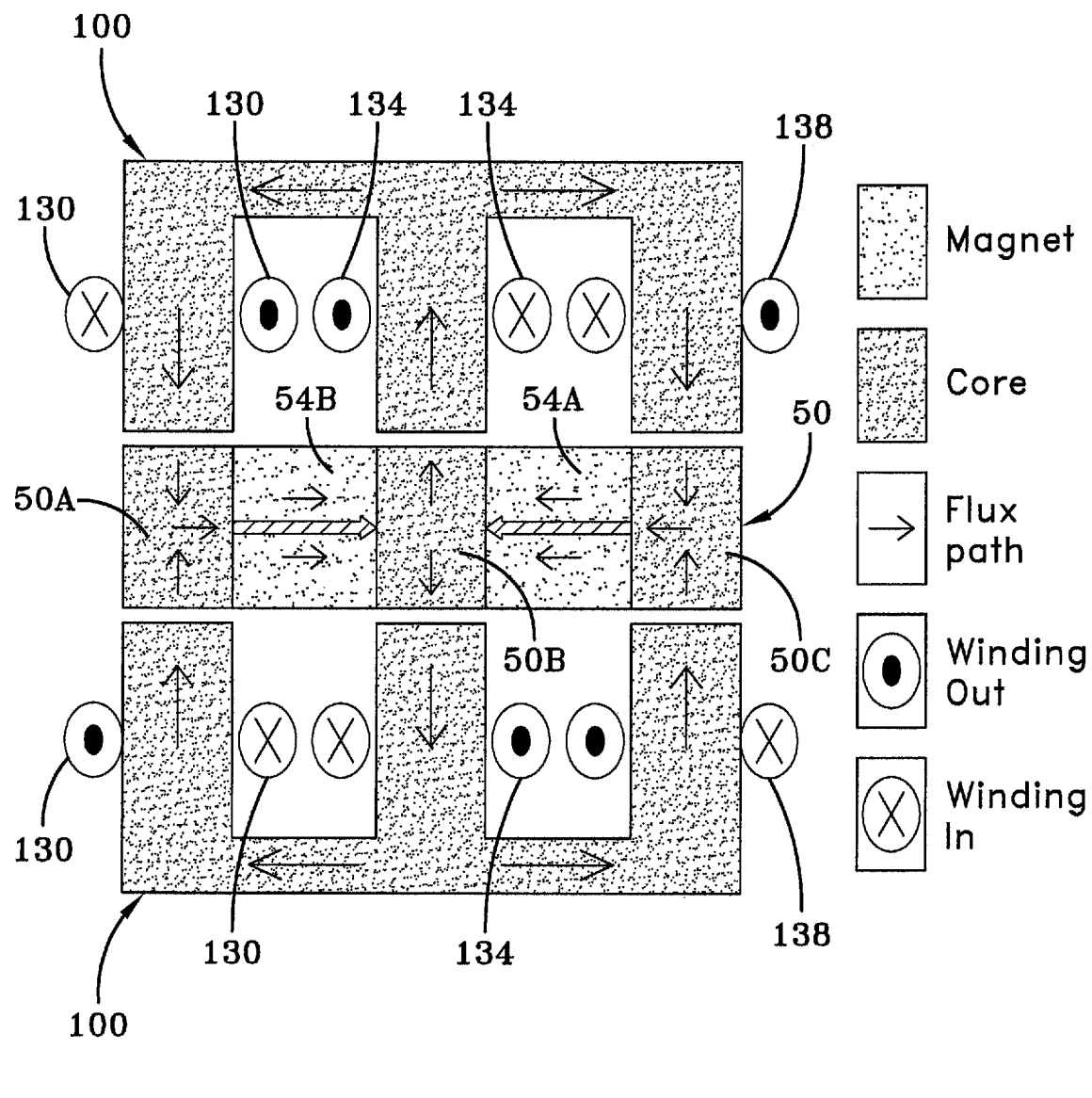
FIG. 5 is a schematic representation of a principal flux path in the transverse flux machine according to the concepts of the present invention.

Referring now to FIGS. 2 and 5, it can be seen that energization of the windings will result in a flux path (represented by the arrows) that is beneficial in generating torque density and providing optimal power efficiency. In particular, it can be seen in the radially focused stator pole 38 that the magnetic polarity of the magnets and the cores is pointing toward the middle rotor core such that the flux leaving the middle rotor core enters the middle leg of the e-cores on the two sides of the rotor ring and are linked back to the magnets through the two outer legs of the E-core. The magnetic polarity and flux direction of the radially diffused stator pole is in the opposite direction. The E-core stators with pole windings envelop the rotor from two sides in the axial direction, as shown in FIG. 4. Accordingly, the pole windings facilitate the short flux path shown in FIG. 5. The magnetic polarity of the magnets is focused toward the middle rotor core as shown in FIG. 4 and FIG. 5. The coils or windings are arranged to that there is a clockwise flux flow in the top right window and an anti or counterclockwise flow in the top left. The flux flow on the other side is mirrored. Hence, the flux is leaving through the middle core and entering through the outer and inner cores. The interpoles 46 provide for additional flux focusing for leakage flux reduction so as to act as flux guides to prevent pole-to-pole leakage and provide additional magneto motive force (MMF) to the machine.

Skilled artisans will appreciate that the use of the laminations for the core elements in the two dimensional plane shown in FIG. 1 would limit the shapes of the rotor and stator segments to cubes. The cuboid modular rotor cores and magnets make the cutting and stacking simpler. The rotor cores are made of laminated steel stacked together. As a result, the inner and outer rotor core is of the same dimension. Therefore, only two lamination cuts are required for the rotor. As noted above, the rotor cores are attached to a non-magnetic disc.

Figure 6A:
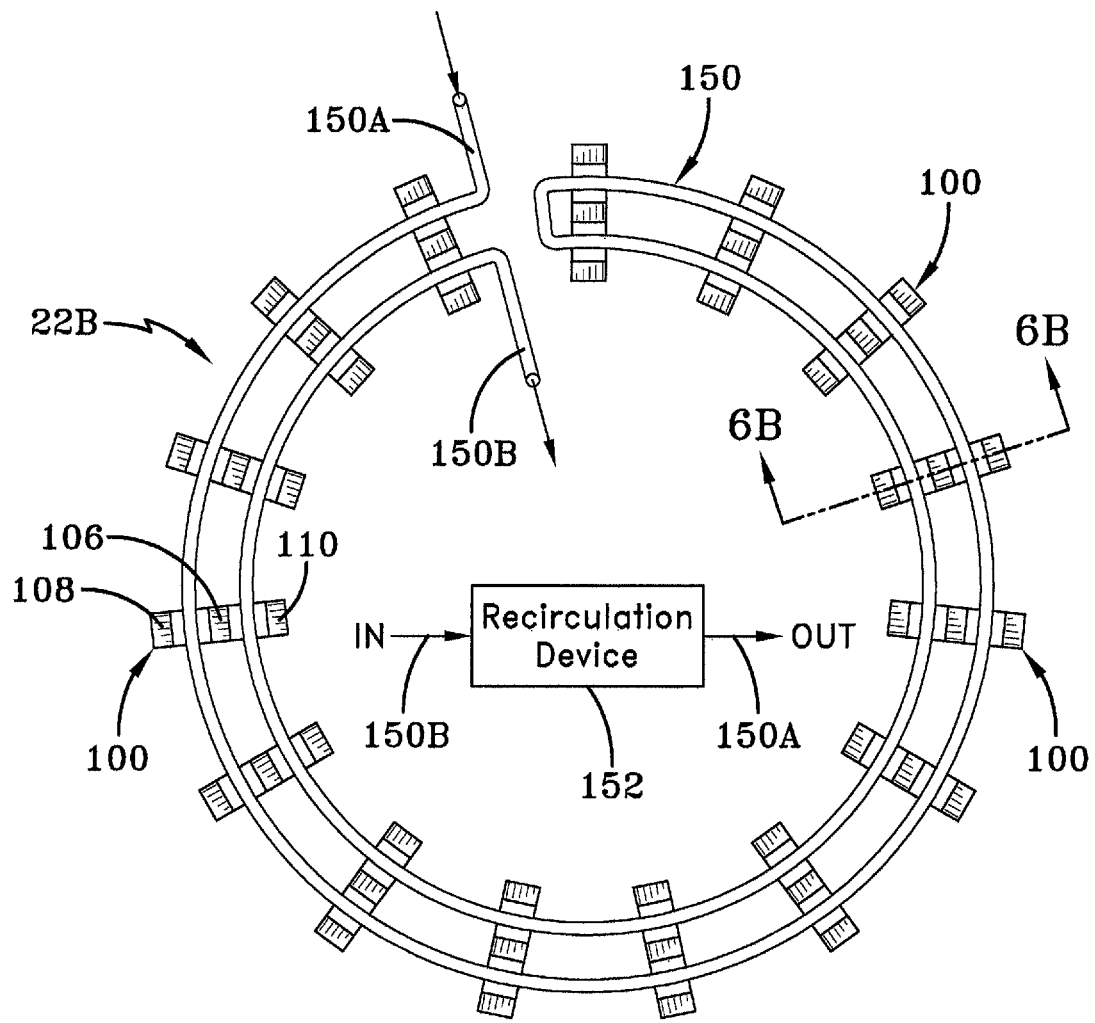
FIG. 6A is a schematic top view of a portion of the stator assembly with a cooling tube directed through the E-shaped cores used in the transverse flux machine according to the concepts of the present invention.
Figure 6B:
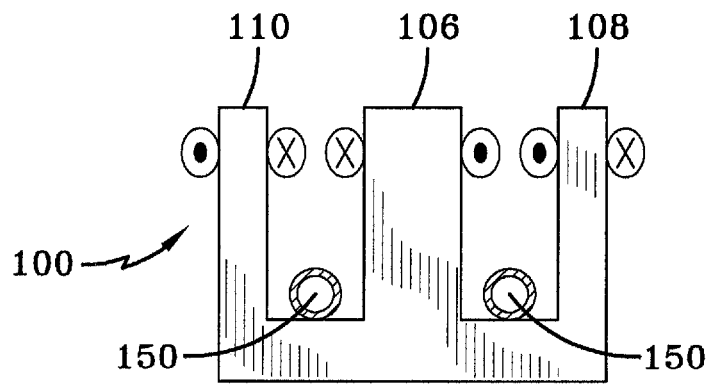
FIG. 6B is a sectional view taken along lines 6B-6B of FIG. 6A to show placement of the cooling tube in the E-shaped core according to the concepts of the present invention.

Referring now to FIGS. 6A and 6B, it can be seen that in some embodiments a cooling tube 150 may be routed through the stator assembly and underneath and/or in between the windings. A recirculation device 152 is attached to each end of the cooling tube 150 so as to circulate cooling fluid throughout the stator assembly 22B so as to maintain the stator operation at an optimal temperature and improve operation thereof.

Figure 7:
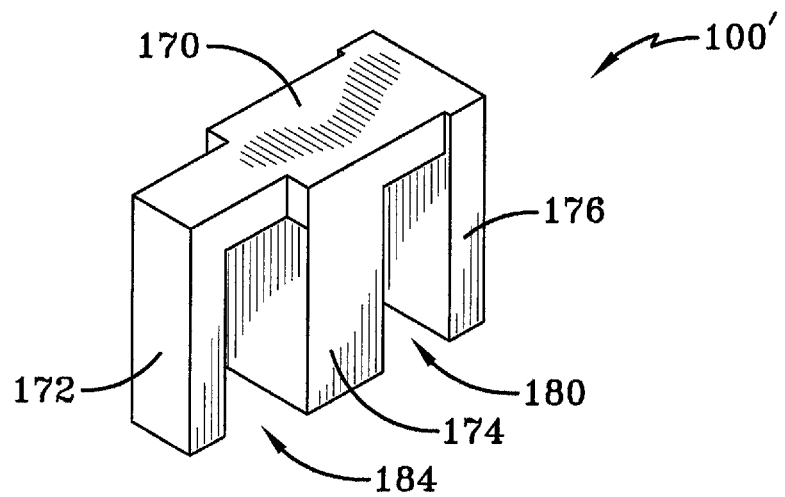
FIG. 7 is a perspective view of an alternative E-shaped core utilized in an alternative embodiment of the transverse flux machine according to the concepts of the present invention.

Referring now to FIG. 7, it can be seen that an alternative E-shaped core is designated generally by the numeral 100'. The alternative E-core 100' is a stepped configuration so as to further improve the flux flow properties in the split stator assemblies 22A and 22B. In the embodiment shown, the E-core 100' provides for a base 170 with an inner radial leg 172 extending from one end. In a similar manner, a middle leg 174 extends from a middle of the base 170 and an outer radial leg 176 extends from an opposite end of the base. Each of the legs 172, 174, and 176 are provided with different widths wherein the widths are dimensionally larger as they extend from the inner to the outer legs. The outer radial leg 176 and the middle leg 174 form an outer gap 180, and in a similar manner the middle leg 174 and the inner radial leg 172 form an inner gap 184. Each of the legs is provided with a winding (not shown) as in the previous embodiment. Such a configuration of a stepped stator results in a smoother variation of the reluctance and this results in improving the cogging torque of the machine without any additional cogging torque minimization techniques.

Figure 8:
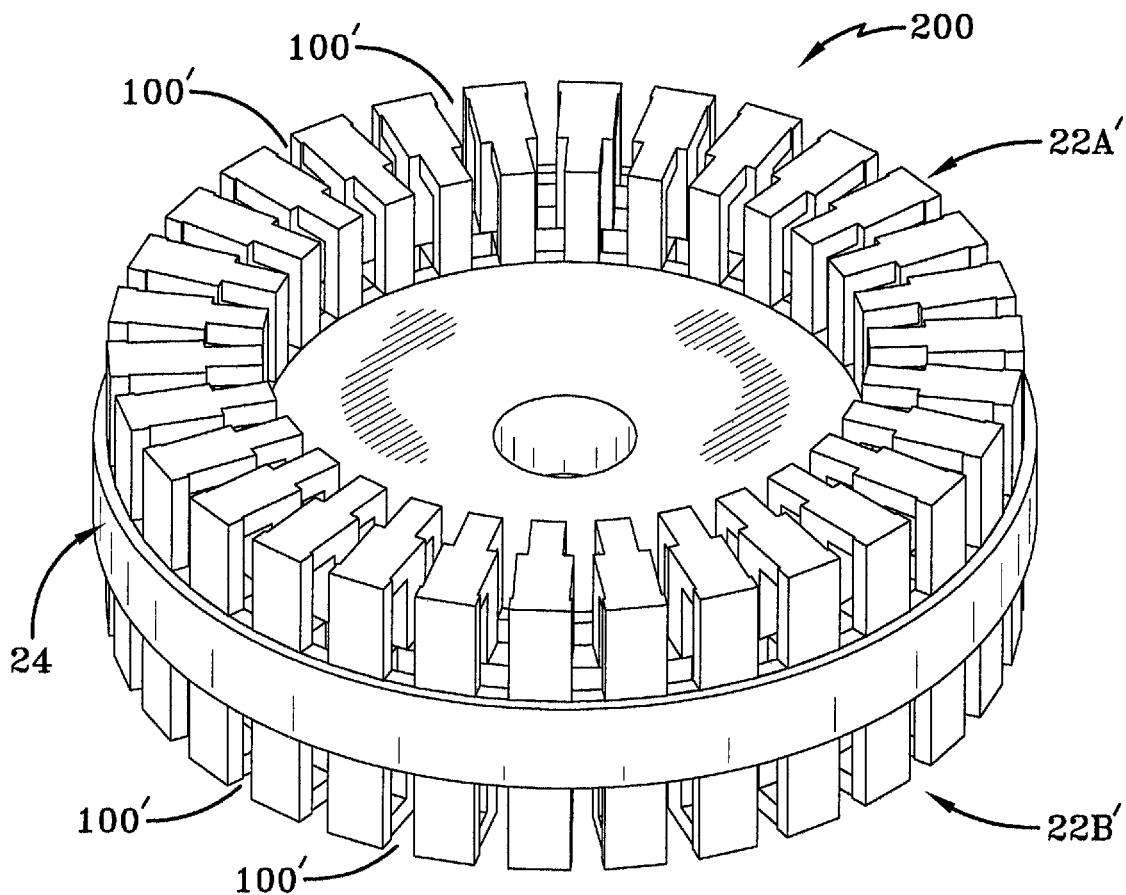
FIG. 8 is a perspective view of a stator assembly (without end plates and windings) and a rotor assembly utilized in the alternative embodiment of the transverse flux machine according to the concepts of the present invention.

Referring now to FIG. 8, it can be seen that an alternative transverse flux machine utilizing the stepped E-cores 100' is designated generally by the numeral 200. In this configuration the rotor assembly 24 is substantially the same as in the embodiment previously discussed; however, the split stator assemblies 22A' and 22B' utilize the alternative E-cores 100'.

The windings in the machine 20 shown in FIG. 4 may be referred to as pole windings, which are wound across each leg of the E-core. Accordingly, simpler modular windings using bobbins can be used, making the winding assembly and the production automated. For the machine shown in FIG. 8, a machine with stepped stators is shown, wherein the machine 200 can accommodate common multiphase concentrated winding machines stator/rotor pole combinations such as 6/4, 9/6, 12/8, 15/10, 18/12, 21/14, 24/16, 9/8, 6/8, 6/10, 6/14, 6/16, 9/8, 9/10, 9/12, 12/10, 12/14, 12/16, 15/14, 15/16, 18/14, 18/16, and 21/16. Such configurations may also be used for the machine 20 shown in FIG. 1.

Figure 9:
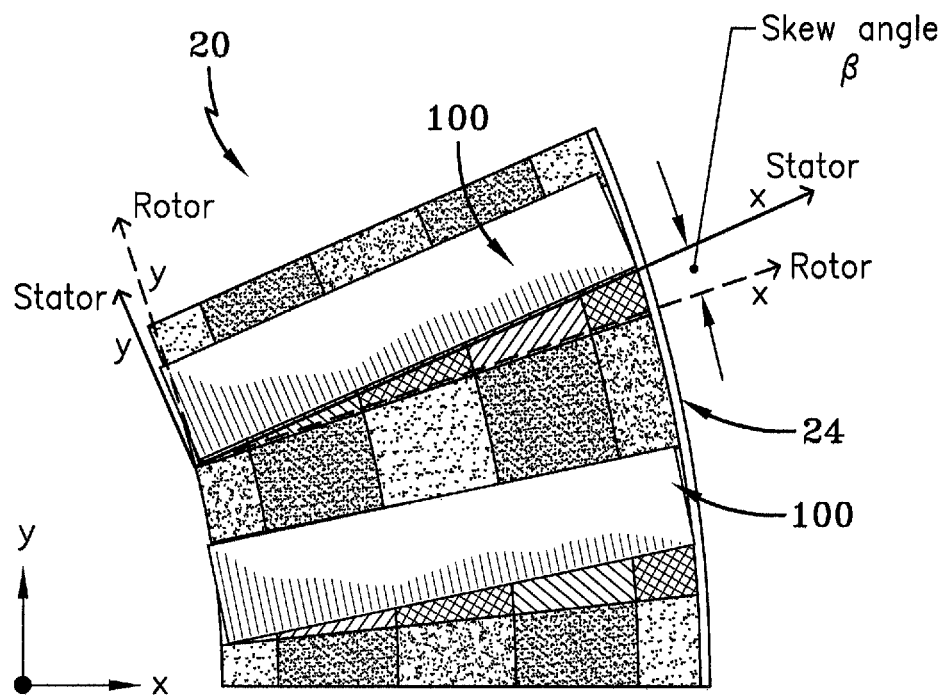
FIG. 9 is a partial top view of the stator and rotor assemblies, wherein the stator assembly is skewed with respect to the rotor assembly according to the concepts of the present invention.

Referring now to FIG. 9, it can be seen that a machine 20A, which may incorporate all the features shown in the machine 20, is proposed which utilizes the rotor assembly 24 and a stator assembly 22'. The E-cores are shown without windings for clarity purposes. In any event, a configuration is shown by the numeral 210 which shows a skew angle. This configuration skews the stator with an angular displacement of skew angle β.

Figure 10:
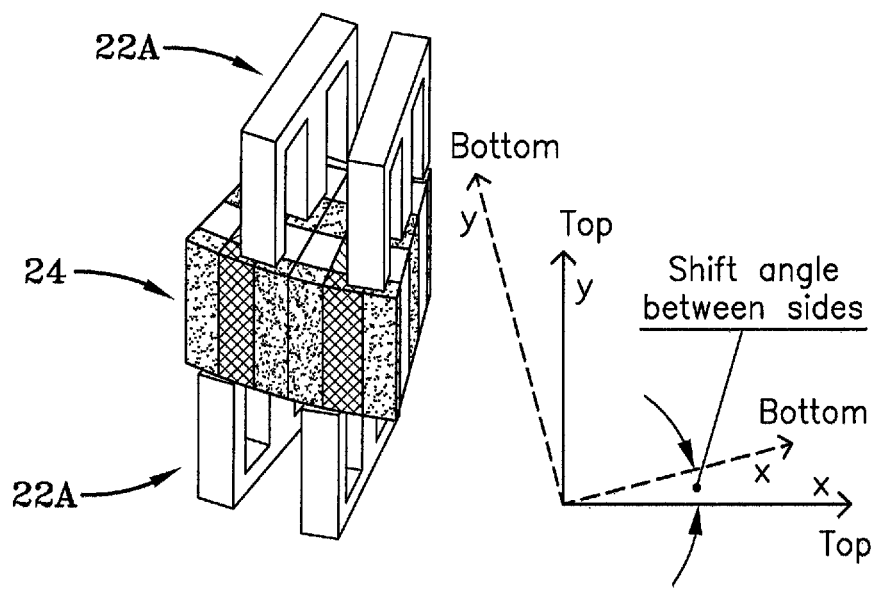
FIG. 10 is a partial perspective view of a stator assembly displaced with respect to a rotor assembly, according to an alternative embodiment of the transverse flux machine according to the concepts of the present invention.

In FIG. 10 a slightly different skewing variation is shown. Skewing reduces the cogging torque by changing the inductance variation. The effect of skewing on the stepped stator for cogging torque minimization is even more prominent. The stator displacement would require the currents in two places to be displaced to reduce cogging torque without reducing average torque.

Figure 11:
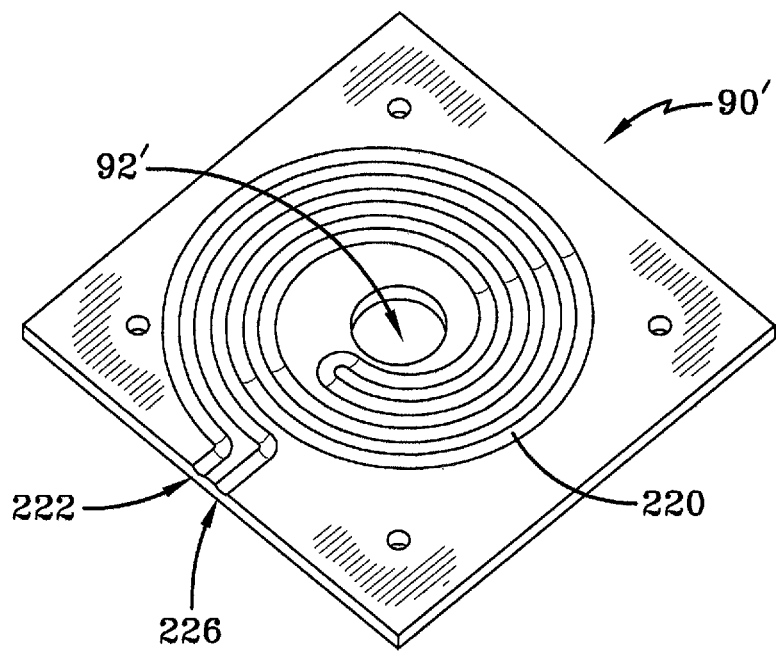
FIG. 11 is a perspective view of an end plate with a cooling channel incorporated therein that may be utilized in the stator assembly according to the concepts of the present invention.

FIG. 11 shows an alternative end plate 90' with a shaft/bearing hole 92' extending there through. In this embodiment, the plate 90' includes a cooling channel 220 which is positioned on a side of the plate opposite of where the pockets 98 are provided. A cover plate or other configuration will be used to enclose the channel 220. The channel 220 has an inlet 222 and an outlet 226 which allows for cooling fluid to be routed there through and remove heat from the stator assembly so as to improve operation of the machine.

Figure 12:
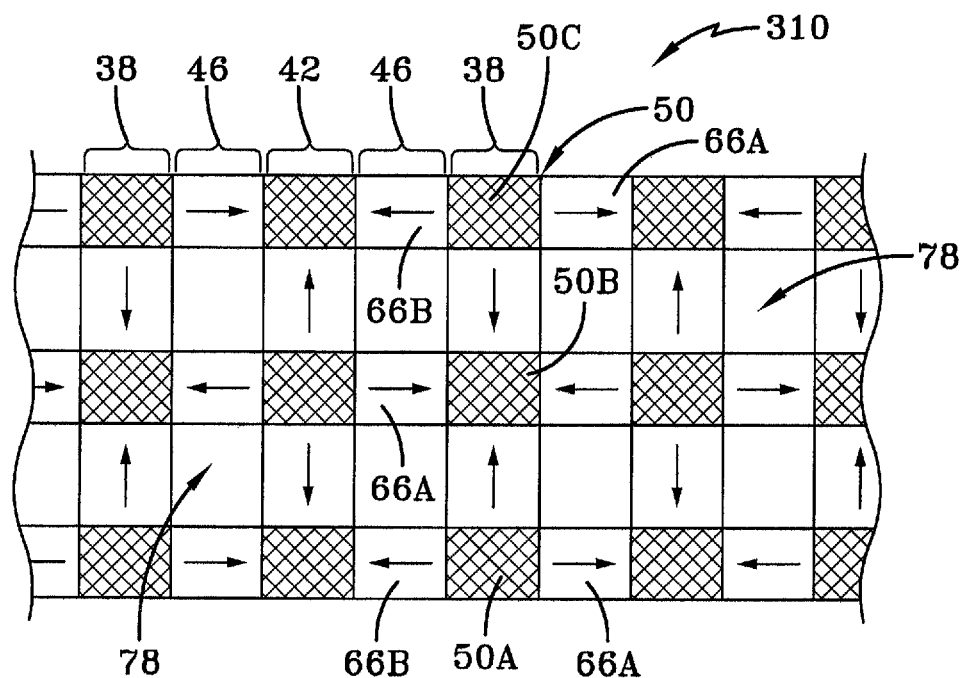
FIG. 12 is an elevational view of a rotor assembly used in another embodiment of a transverse flux machine according to the concepts of the present invention.
Figure 13:
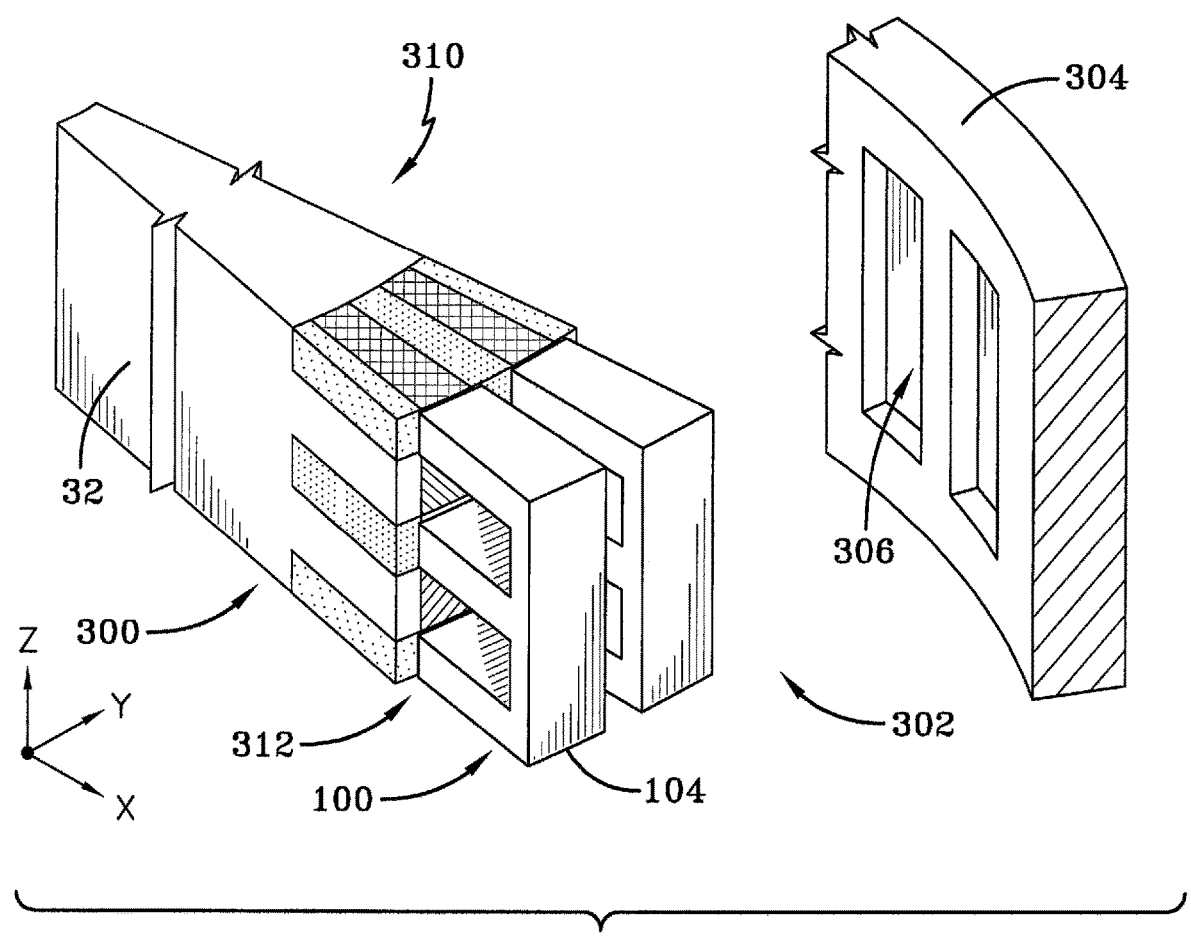
FIG. 13 is a partial perspective view of the rotor assembly and a stator assembly with its end plate spaced apart for clarity purposes, which are used in the other embodiment of the transverse flux machine according to the concepts of the present invention.
Figure 14:
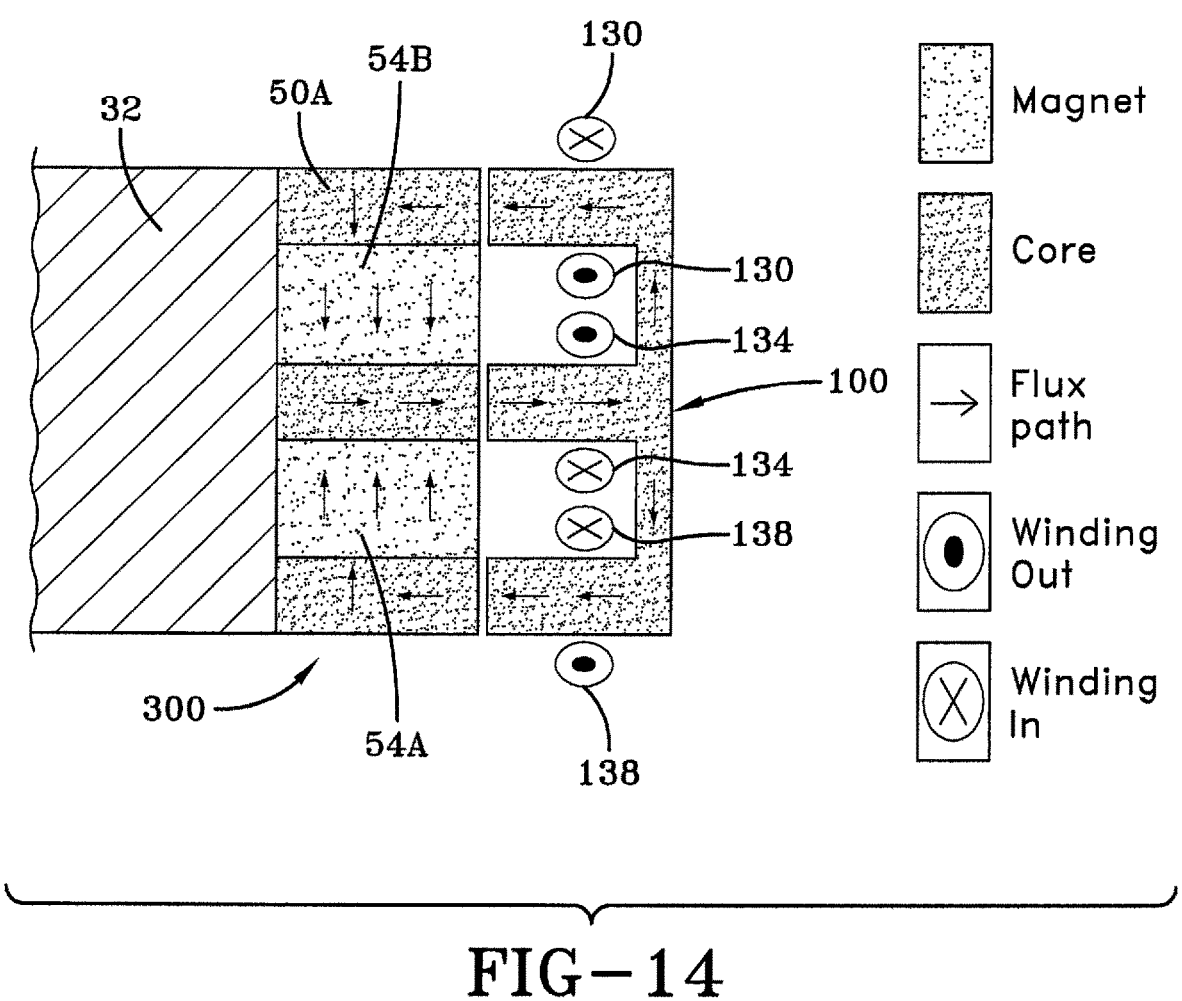
FIG. 14 illustrates a flux path in the other embodiment of the transverse flux machine according to the concepts of the present invention.

Referring now to FIGS. 12-14, it can be seen that a radial configuration of a transverse flux machine is designated generally by the numeral 300. Such a machine includes a stator assembly 303 which uses a similar E-core 100 as in the previous embodiment, but in this embodiment the E-core is orientated on its side and is radially positioned with respect to the rotor assembly. The E-cores 100 are held in place by a non-magnetic circular end plate 304 which provides for pockets 306 so as to hold the base 104 of the E-core. In the machine 300 a rotor assembly 310 is provided wherein the stator poles and interpoles are configured in a manner similar to that shown in FIG. 2. The only distinction being that the poles 38 and 42, and the interpoles 46 are set out on a radial surface of the rotor assembly 310 instead of an axial surface. As a result, the machine 300 provides for an air gap 312 in a radial direction. The machine 300 provides better structural integrity and is suited for applications requiring small diameters and higher axial length. Flux patterns for the machine 300 are seen in FIG. 14 and are similar to those shown in FIG. 5.

The machine 20 or 300 is a permanent magnet synchronous machine arranged such that the airgap flux can be either axial or radial directions. The flux linking the rotor and stator is in the transverse direction (perpendicular to the direction of motion).

In any of the embodiments disclosed herein, the permanent magnets in the rotor focus the flux into the middle core to attain a high flux density. In the proposed machines, the flux-focusing factor helps determine the air gap flux density ($B_g$) of the machine. The focusing factor ($k_f$) is defined as:

$$k_f = \frac{B_g}{B_m} = \frac{A_m}{A_p} \quad (1)$$

where, $B_m$ is the working flux of the PMs, is the area of the magnet, is the area of the pole.

Due to the magnets a rotating magnetic flux is produced. The currents windings in the stator result in stator MMF. The stator flux revolves in the same speed as the rotor flux (rotor speed). For example, when the machine is excited with three phase currents it produces a rotating magnetic field that is constant in magnitude and the same frequency as the currents. The flux in the rotor due to the permanent magnets are attracted to lock into the stator mmf and as a result torque is produced. Due to the flux linkage of the magnets the stator experiences an induced emf also known as back-emf. The shape of this back-emf (dependent on the machine geometry) determines the torque quality (cogging torque and torque ripple in the machine).

A numerical study using finite element methods was done on the proposed machines to verify their effectiveness. A case study machine rated at 1.1 kW and 400 rpm was designed with an outer diameter of 100 mm and axial length of 65 mm. Two versions of the machine were designed and simulated. One of them was with the conventional stator and the other one was with the stepped stator. The machines used laminations for the core and ferrite magnets (different and higher power magnets are also suitable). The other dimensions are the same.

TABLE 1

|  | Stepped Machine | Without Step |
|---|---|---|
| Torque | 31 Nm | 27.45 |
| Speed | 400 rpm | 400 rpm |
| DC Bus | 48 | 48 |
| RMS Current | 32.52 | 32.52 |
| Power Factor | 0.626 | 0.62 |
| Volume torque density | 15.5 Nm/l | 13.725 Nm/l |
| Torque density | 3.47 | 3.27 |

The advantages of the present disclosure are readily apparent. In particular, the machines provide for a multiphase operation on a single stack wherein the number of rotor poles and stator cores are made to be non-equal. As a result, a single stack multiphase transverse flux machine can be obtained which results in a compact and efficient electric machine.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A single stack transverse flux machine, comprising:
a rotor assembly comprising:
an internal rotor disc, a rotor shaft extending from and rotating with said internal rotor disc, and a rotor ring comprising a plurality of stator poles interleaved with a plurality of interpoles, wherein said plurality of stator poles and said plurality of interpoles are radially disposed around said internal rotor disc, each said stator pole having a plurality of core components spaced apart from one another, wherein primary magnets are interposed between said plurality of core components; and
a stator assembly comprising a plurality of shaped cores, each said shaped core having a base with a plurality of legs with a corresponding gap between each said leg, each said leg having a modular winding, wherein said shaped cores are E-shaped, said plurality of shaped cores including a first subset of shaped cores positioned entirely above said rotor assembly and a second subset of shaped cores positioned entirely below said rotor assembly, said shaped cores positioned so that each said leg is juxtaposed with a corresponding one of said plurality of core components and having an air gap therebetween;

wherein each said interpole comprises: a plurality of intermediate magnets, wherein each said intermediate magnet is laterally interposed between corresponding core components of said plurality of core components of said stator poles.

2. The machine according to claim 1, wherein said plurality of core components are radially positioned with respect to said internal rotor disc, and wherein each said primary magnet is positioned in between two of said core components.

3. A single stack transverse flux machine, comprising:
a rotor assembly comprising:
an internal rotor disc,
a rotor shaft extending from and rotating with said internal rotor disc, and
a rotor ring comprising a plurality of stator poles interleaved with a plurality of interpoles, wherein said plurality of stator poles and said plurality of interpoles are radially disposed around said internal rotor disc, each said stator pole having a plurality of core components spaced apart from one another, wherein primary magnets are interposed between said plurality of core components; and
a stator assembly comprising a plurality of shaped cores, each said shaped core having a base with a plurality of legs with a corresponding gap between each said leg, each said leg having a winding,
said shaped cores positioned so that each said leg is juxtaposed with a corresponding one of said plurality of core components and having an air gap therebetween,
wherein said plurality of core components are radially positioned with respect to said internal rotor disc, and wherein each said primary magnet is positioned in between two of said core components, and
wherein each said interpole comprises:
a plurality of intermediate magnets, wherein each said intermediate magnet is laterally interposed between corresponding core components of said plurality of core components of said stator poles.

4. The machine according to claim 3, further comprising:
a cooling tube routed between said windings.

5. The machine according to claim 3, wherein said stator assembly further comprises:
a pair of opposed end plates, each said end plate having a shaft hole therethrough and a plurality of core pockets, each said core pocket receiving one of said shaped cores, and said rotor assembly axially positioned between said pair of opposed end plates so as to form said air gap between said legs of said shaped cores and said plurality of primary and intermediate poles of said rotor assembly.

6. The machine according to claim 5, wherein said plurality of stator poles are unequal in number to said plurality of shaped cores in one of said opposed end plates.

7. The machine according to claim 5, wherein said plurality of core pockets in one said end plate are misaligned with respect to said plurality of core pockets in said other end plate.

8. The machine according to claim 5, wherein at least one of said end plates has a cooling channel.

9. The machine according to claim 5, wherein said shaped cores are E-shaped.

10. The machine according to claim 9, wherein said E-shaped cores have legs of progressively increasing width from an inner leg to a middle leg to an outer leg, wherein said inner leg is positioned closest to said internal rotor disc.

11. The machine according to claim 3, wherein said stator poles comprise:
a plurality of radially focused stator poles; and
a plurality of radially diffused stator poles interleaved between said plurality of radially focused stator poles, and wherein said plurality of interpoles are interleaved between each of said plurality of radially focused stator poles and said plurality of radially diffused stator poles.

12. The machine according to claim 11, wherein said plurality of interpoles comprise:
at least one clockwise leakage reduction magnet and at least one counterclockwise leakage reduction magnet, wherein said leakage reduction magnets are laterally aligned with corresponding core components of said plurality of radially focused stator poles and said plurality of radially diffused stator poles.

13. The machine according to claim 3, wherein said stator assembly further comprises:
a circular end plate having a plurality of core pockets, each said core pocket receiving one of said shaped cores, and said rotor assembly radially positioned within said circular end plate so as to form said air gap between said legs of said shaped cores and said plurality of primary and intermediate poles of said rotor assembly.

14. The machine according to claim 13, wherein said plurality of core components, said plurality of primary magnets, and said plurality of intermediate magnets are all radially adjacent said internal rotor disc.

15. The machine according to claim 13, wherein said shaped cores are E-shaped.

16. A single stack transverse flux machine, comprising:
a rotor assembly comprising:
an internal rotor disc, a rotor shaft extending from and rotating with said internal rotor disc, and a rotor ring comprising a plurality of stator poles interleaved with a plurality of interpoles, wherein said plurality of stator poles and said plurality of interpoles are radially disposed around said internal rotor disc, each said stator pole having a plurality of core components spaced apart from one another, wherein primary magnets are interposed between said plurality of core components;
a first stator split assembly comprising a first plurality of shaped cores positioned entirely above said rotor assembly; and a second stator split assembly comprising a second plurality of shaped cores positioned entirely below said rotor assembly; each said shaped core of said first plurality of shaped cores and of said second plurality of shaped cores having a base with a plurality of legs with a corresponding gap between each said leg, each said leg having a modular winding, said shaped cores positioned so that each said leg is juxtaposed with a corresponding one of said plurality of core components and having an air gap therebetween;

wherein each said interpole comprises: a plurality of intermediate magnets, wherein each said intermediate magnet is laterally interposed between corresponding core components of said plurality of core components of said stator poles.

17. The machine according to claim 16, wherein said shaped cores are E-shaped.

\* \* \* \* \*